United States Patent [19]
Davison et al.

[11] Patent Number: 5,964,325
[45] Date of Patent: Oct. 12, 1999

[54] S-CAM BRAKE BUSHING CARTRIDGE

[75] Inventors: Kent Eugene Davison, Columbia City; Martin G. Blessing, Ft. Wayne, both of Ind.

[73] Assignee: Dana Corporation, Toledo, Ohio

[21] Appl. No.: 08/948,732

[22] Filed: Oct. 10, 1997

[51] Int. Cl.⁶ .............................. F16D 51/00; F16C 33/74
[52] U.S. Cl. ........................ 188/330; 384/145; 384/152
[58] Field of Search .................... 384/145, 146, 384/213, 209, 152; 188/79.55, 330; 184/105.3

[56] References Cited

U.S. PATENT DOCUMENTS

| | | | |
|---|---|---|---|
| 1,562,130 | 11/1925 | Stitzinger | 384/213 |
| 2,249,501 | 7/1941 | Teker | 184/105.3 |
| 2,331,652 | 10/1943 | Buckendale . | |
| 2,892,662 | 6/1959 | Scheel . | |
| 3,368,648 | 2/1968 | Brownyer . | |
| 3,589,781 | 6/1971 | Hanley | 384/152 |
| 3,819,242 | 6/1974 | Robinson | 384/152 |
| 5,238,310 | 8/1993 | Layfield | 384/145 |
| 5,316,111 | 5/1994 | Layfield . | |
| 5,547,288 | 8/1996 | Quinn et al. | 384/152 |

Primary Examiner—Robert J. Oberleitner
Assistant Examiner—Jeffrey Woller
Attorney, Agent, or Firm—Oldham & Oldham Co., L.P.A.

[57] ABSTRACT

An improved bushing assembly for the inboard end of a brake cam shaft is provided with a bushing which establishes a grease flow pathway within the bushing assembly. Grease enters a cavity formed from a pair of housing halves which contain the bushing through a grease zerk which is directly connected to a first radial hole in the bushing, so the fresh grease injected goes directly to the grease reservoir between the bushing and the shaft. Flow channels provided in the bushing interior surface guide the grease around the shaft to a second radial hole which is diametrically opposite the first radial hole. A seal on the shaft restricts grease flow outwardly from the bushing along the shaft. Grease may be purged through the second radial hole to an annular space between the bushing and the interior surfaces of the housing halves, from which the grease may exit the housing around the periphery of a window in one of the housing halves through which the grease zerk passes.

10 Claims, 3 Drawing Sheets

S-CAM BRAKE BUSHING CARTRIDGE

The present invention relates to a bushing assembly for use with a cam shaft associated with the brakes of a vehicle. More particularly, the present invention relates to a bushing assembly having a bushing retained in a pair of housing halves, for use in supporting the cam shaft rotatably along an axle in a generally parallel relationship to the axle, particularly near the inboard end of the cam shaft.

BACKGROUND OF THE ART

In an air brake for a vehicle, particularly a truck or semi-trailer, the expansion of an air chamber by actuation of a brake pedal causes a shaft positioned on two bushing assemblies located adjacent to the wheel axle to rotate. The rotation of the shaft rotates an S-cam located at the outboard end of the shaft. Brake shoes which are held in contact with the S-cam are urged outwardly by the rotation of the S-cam and its shape. The outward motion of the brake shoes places brake liners mounted on the brake shoes into frictional engagement with a brake drum of the wheel hub, resulting in braking of the wheel mounted on the hub.

The shaft is an area of concern in maintaining the air brakes. It is important to be able to remove the shaft, particularly without removing the wheel hub. It is also important to be able to remove and maintain the bushings which permit the rotation of the shaft while holding it in fixed position relative to the axle. The first of the bushings is located near the inboard end of the shaft near the brake actuator, and it is generally referred to in this invention as the inboard bushing. The second of the bushings is located at the brake spider, where the shaft typically passes through a boss in the spider. Since this second bushing is located towards the outboard end of the shaft, we refer to it in this application as the "outboard bushing." While some of the problems with the bushings are shared by both bushings, there are other problems which are unique to each of the bushings. Problems in the art include wear surface contamination in the bushing assembly, particularly the bushing assembly nearer the air chamber. The present invention is focused on the inboard bushing.

SUMMARY OF THE INVENTION

It is therefore an object of the present invention to provide an inboard bushing assembly for a brake shaft of a vehicle which reduces bushing wear through a grease sealing and purge system which eliminates wear surface contamination, particularly by providing a specific grease flow path within the bushing assembly. This and other objects of the invention are achieved by a brake shaft assembly for a vehicle having an axle with a wheel hub at an end of the axle and a brake actuating means located inboard from the wheel hub. The brake shaft assembly comprises a shaft, first and second support brackets affixed to the axle and first and second bushing assemblies. The shaft has a first end and a second end, with the first end of the shaft having a brake actuating lever arm attached to it and the second end of the shaft having a cam fixed on it. The first and second support brackets are affixed to the axle, and each of the brackets provides an aperture for passage of the shaft through the bracket. The first and a second bushing assembly support the shaft rotatably, substantially parallel to the axle, the first bushing assembly surrounding the shaft near the first end and retaining the shaft in the aperture of the first bracket and the second bushing assembly surrounding the shaft near the second end and retaining the shaft in the aperture of the second bracket. In the present invention, the first bushing assembly, which is located near the inboard end of the shaft, comprises first and second housing halves, a bushing, a grease zerk, a grease purge hole and a pair of bushing end seals. The first and second housing halves are generally mirror images of each other and are juxtaposable to define an internal cavity. The bushing has an outside surface which is sized and adapted to be received in the cavity in a stationary manner and an inside surface sized and adapted to receive the shaft, with sufficient spacing between the inside surface and the shaft to create and maintain a reservoir for grease to lubricate the wear surfaces of the bushing and the shaft. The grease zerk communicates the outside of one of the housing halves with the cavity, and particularly with the grease reservoir between the bushing and the shaft, through a radial hole in the bushing to which the grease zerk is directly connected. The pair of bushing end seals assist in retaining grease in the grease reservoir. A second radial hole in the bushing provides a conduit for grease to flow from the grease reservoir to an outer annular reservoir located between the outer bushing surface and the housing halves. This outer annular reservoir is communicated to the outside of the housing halves through a window or hole in which the grease zerk is seated.

BRIEF DESCRIPTION OF THE DRAWINGS

These and other aspects of the present invention will be better understood when reference is made to the accompanying drawing, wherein identical parts are identified by identical reference numerals and wherein.

DETAILED DESCRIPTION OF THE INVENTION

Figure 1:
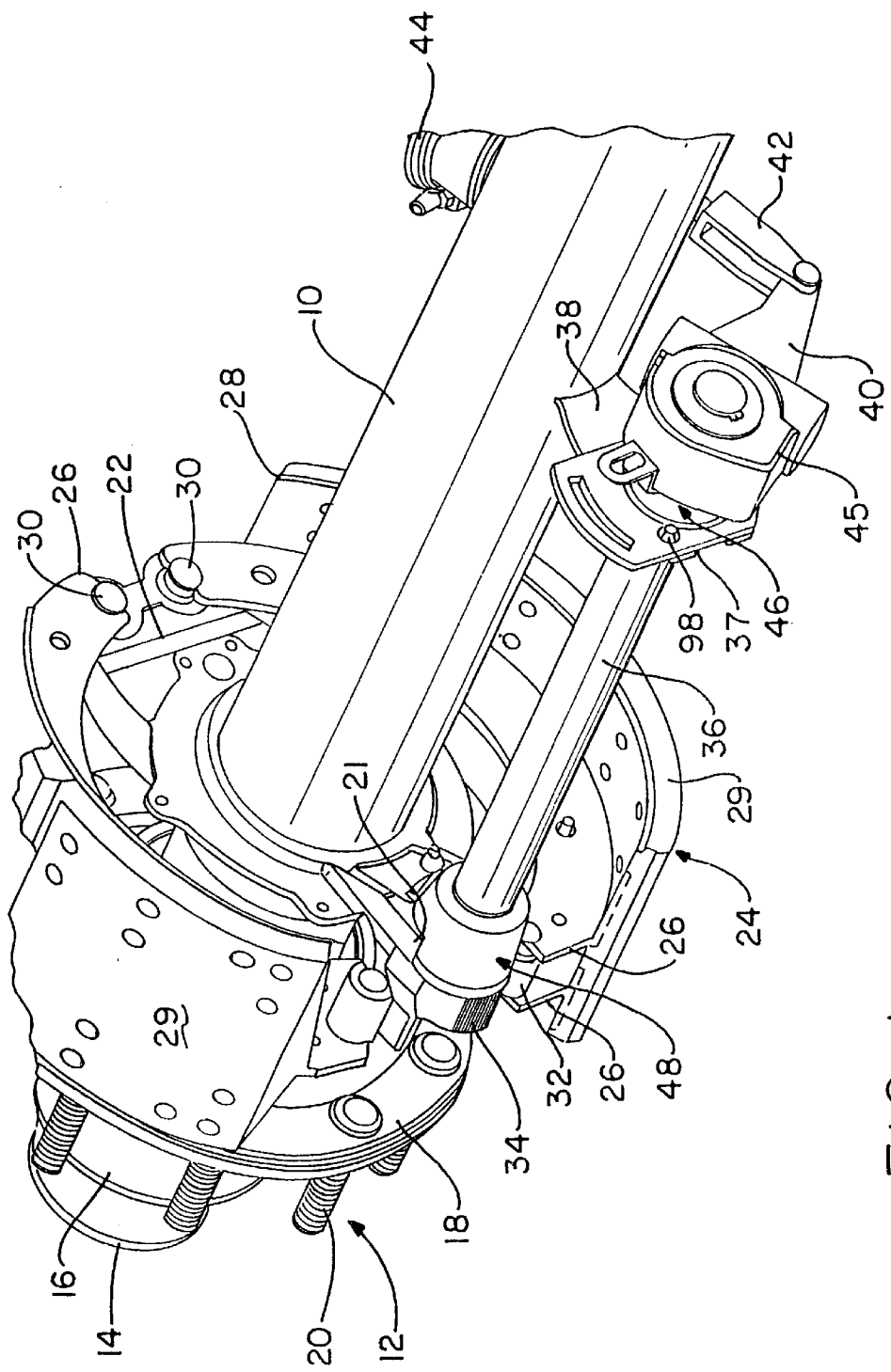
FIG. 1 is a perspective view of an axle of a vehicle having an S-cam brake assembly mounted thereon.

The present invention is shown in FIG. 1 where a perspective view of the external structures of a vehicle brake assembly are disclosed. Particularly, one end of an axle 10 is shown. The axle terminates at an outboard end in a wheel hub assembly, generally shown as 12. It will be understood that the opposite end of the axle 10 will be similarly provided. The present invention is applicable to both driven and non-driven axles, with the difference being that a driven axle will have a driven shaft (not shown) housed within an axle housing, whereas a non-driven axle will lack such a driven shaft and the "axle housing" will be referred to as just the "axle". As this present description refers to a non-driven axle, the term "axle" will be understood as applying to the "axle housing" in the case of a driven axle. The outboard end of the axle 10 is provided with a spindle 14 which may have a wheel hub 16 rotatably mounted thereupon. If the axle is a driven axle, the wheel hub 16 will be rigidly affixable to the driven shaft which passes through a hollow spindle 14 so that drive torque is transmitted directly from the axle shaft to the wheel hub 16. If the axle in non-driven, as is the case of FIG. 1, the wheel hub 16 will rotate freely on a bearing set interposed between the wheel hub and the spindle 14. Typically, the bearing set will comprise an inboard bearing and an outboard bearing, and details of such a bearing set will be known to one of skill in this art. The wheel hub 16 is provided with a flanged portion 18 and a plurality of threaded studs 20 for the mounting of the wheel rim (not shown) on the wheel hub. A brake spider 22 is rigidly affixed to the axle 10. A pair of opposed brake shoes 24 are mounted to the brake spider 22. Each of the brake shoes 24 has a pair of spaced apart web members 26, the radially outward surface of each web member 26 terminating in a brake table 28, upon which frictional brake liners 29 are mounted. One end of each web member 26 is pivotably mounted to the brake spider 22 by an anchor pin 30 and the second end of each web member has a roller 32 mounted in it. The rollers 32 in the web members are held in contact with a cam 34 which is fixed to an outboard or second end of a shaft 36, through biasing means, typically springs (not shown). The shaft 36 passes through an aperture 21 in the brake spider 22, which serves as a support bracket for the outboard or second end of the shaft. The axis of the shaft 36 is generally positioned parallel to the axis of the axle 10. An inboard or first end of the shaft also passes through an aperture 37 in an inboard support bracket 38 which is rigidly affixed to the axle, typically by welding. The apertures 21, 37 in the respective support brackets 22, 38 are aligned for keeping the shaft 36 essentially parallel to the axis of the axle 10. At the inboard or first end of the shaft 36, a brake actuating lever arm 40 is attached, so that longitudinal motion of a brake actuator arm 42 affixed to a brake actuating means 44 results in rotation of the shaft. It is this rotation of the shaft 36 which effects rotation of cam 34, resulting in outward expansion of the brake shoes 24 against a brake drum (not shown) on the wheel mounted to the wheel hub 16. This type of brake actuating mechanism as generally described is known in the prior art. As shown in FIG. 1, the attachment of the brake actuating arm 40 to the inboard end of cam shaft 36 is achieved through the use of a brake cam adjuster 45, which is known in the art and which is used to adjust the brakes as the brake liners 29 wear through use.

At the inboard support bracket 38 and the brake spider 22 (which serves as the outboard support bracket) respectively, it is necessary to provide a first and a second bushing assembly 46, 48 for supporting the shaft 36 rotatably, substantially parallel to the axle. The first or inboard bushing assembly 46 surrounds the shaft 36 near the first or inboard end, that is, near the brake actuator 44 and retains the shaft in the aperture in the support bracket 38. The second or outboard bushing assembly 48 surrounds the shaft 36 near the outboard or second end and retains the shaft in the aperture of the brake spider 22. The second or outboard bushing assembly 48 may be of a type as known in the prior art, as it is not the focus of the present invention. The first or inboard bushing assembly 46 is, however, the focus of the present invention and attention is now directed to that bushing assembly, and particularly to the details as disclosed in FIGS. 2–4.

Figure 2:
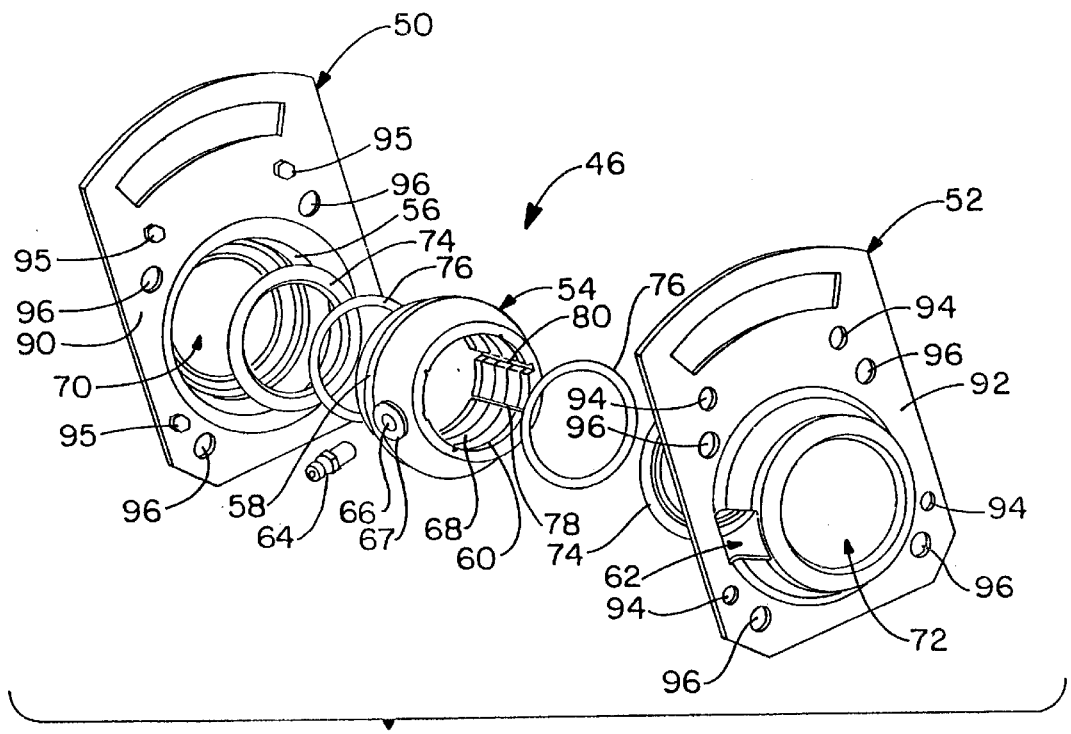
FIG. 2 is a exploded perspective view of the S-cam bushing assembly of the present assembly.
Figure 3:
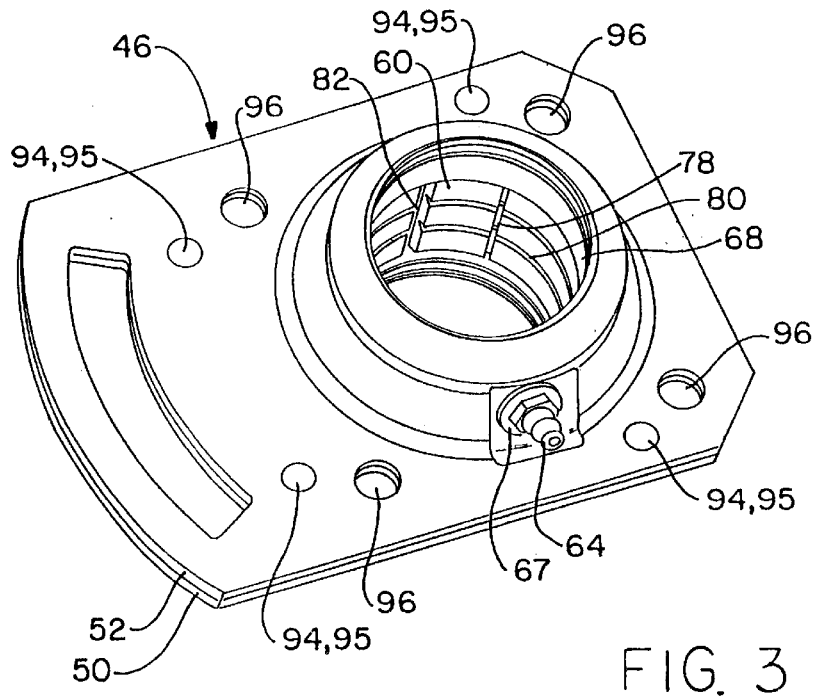
FIG. 3 is an assembled perspective view of the present invention.
Figure 4:
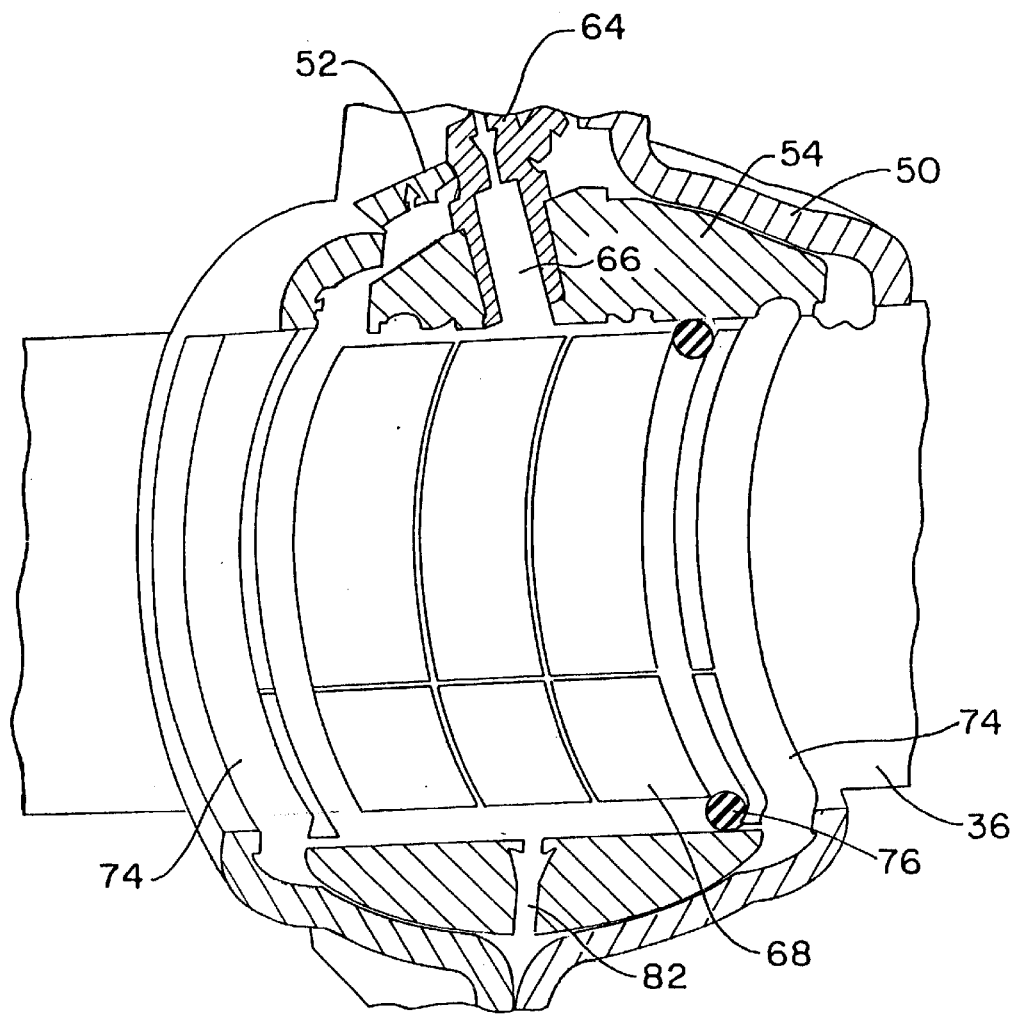
FIG. 4 is a side sectional view of the present invention.

FIGS. 2 and 3 show a perspective view of the inboard bushing assembly 46, in exploded and assembled conditions, respectively. The inboard bushing assembly 46 generally comprises three major components, namely a first housing half 50, a second housing half 52 and a bushing 54. The first and second housing halves 50, 52 are shaped so that when they are juxtaposed, they define an interior cavity 56, with substantially one half of the interior cavity being provided by each of the housing halves. This interior cavity 56 is sized and shaped so that it receives the bushing 54 and generally provides only limited rotational movement of the bushing. The bushing 54 has an outside surface 58 which is preferred to be toroidal in shape and even more preferred to be spherical in shape and a generally cylindrical inside surface 60 defined by the aperture in the center of the bushing. The outside surface 58 is sized and adapted to be received in the cavity formed by the housing halves 50, 52 and the inside surface 60 is sized and adapted to receive the shaft 36, preferably in a sliding engagement. Lubrication with grease of the interface between the bushing inside surface 60 and the exterior surface of the shaft 36 as it passes therethrough is appropriate to minimize wear of these surfaces.

At least one of the two housing halves (in this case, housing half 52) is provided with a window 62 for insertion of a grease zerk 64 for communicating the exterior of that housing half with the cavity 56 and particularly with the bearing surface between the bushing 54 and the shaft 36. The bushing 54 is provided with only limited rotational movement, so it is provided with a radial hole 66 which communicates the outside surface 58 of the bushing to the inside surface 60. Preferably, the radial hole 66 is surrounded by a raised boss 67 on bushing 54 to assist in sealing the zerk window 62. By positioning the bushing 54 in the cavity 56 so that the grease zerk 64, positioned inside window 62, is inserted directly into the radial hole 66, a grease conduit is established. This grease conduit directly communicates the exterior of the bushing assembly 46 with the shaft 36 as it passes through the bushing 54. Because of the spacing required between the inside surface 60 of the bushing and the outside surface of the shaft 36 to provide the sliding engagement them, a grease reservoir 68 is effectively formed along the length of the shaft inside the bushing. The radial hole 66 and the grease reservoir 68 are best viewed in FIG. 4, which shows a partially cut away section of the bushing assembly 46 and its component parts.

Each of the housing halves 50, 52 has a shaft-receiving aperture 70, 72, respectively, which is positioned coaxial with the cavity 56 so that the shaft 36 may pass through the housing halves and the bushing 54 contained within the cavity 56. Because the shaft-receiving apertures 70, 72 in the housing halves 50, 52 would provide an opportunity for grease to flow out of the cavity 56, the bushing assembly is also provided with a pair of bushing end seals 74 for retaining grease in the cavity 56, and particularly in the grease reservoir 68. One of these bushing end seals 74 will be seated on the shaft 36 on either side of the bushing 54 between the bushing and the aperture in the adjacent housing half. In the preferred embodiment of the present invention, the bushing end seals 74 are double seal surface D-rings. The bushing end seals are seatable in the shaft 36. In some embodiments of the invention, it may be desirable to use at least one O-ring 76 along the shaft 36 between the bushing end seals 74 for retaining the grease on the primary bearing wear surface, which is the inside surface of the bearing. In the preferred embodiments, there is one such O-ring 76 toward each end of the grease reservoir 68 near the D-ring 74. In some embodiments, additional O-rings may be placed strategically along the shaft 36 inside the grease reservoir for isolating the grease reservoir into zones. It is also desirable in some embodiments of the invention to provide the inside surface of the bushing with channels for facilitating grease flow. Some of these channels may be longitudinal and some of these may be circumferential, the longitudinal channels being shown in the drawings as 78 and the circumferential channels indicated as 80.

The bushing 54 is also provided with a radial hole 82 communicating the grease reservoir 68 with an outer annular volume between the outer bushing surface 58 and the housing halves 50, 52. The preferred location for this radial hole 82 is diametrically opposite the grease zerk radial hole 66, because this location requires grease to travel around half of the shaft circumference within the grease reservoir 68 before leaving the reservoir via radial hole 82. The sealing of the reservoir 68 at each end by the use of the D-rings 74 and O-rings 76 requires any flow of grease out of the reservoir to occur through radial hole 82. At the outer end of radial hole 82, the grease is deposited into the annular space between the outside surface 58 of bushing 54 and the housing halves 50, 52. However, since this annular space is sealed by the presence of the D-rings 74 at the ends of the bushing 54 any flow of grease out of this annular space must occur through the only opening left, which is the zerk window 62. Since the zerk window 62 is preferably diametrically opposite the radial hole 82, any such flow of grease must also pass over half of the outside circumference of the bushing before exiting the bushing assembly 46 at the zerk window 62 in the small space between the zerk window and the boss 67. In this manner, a preferred grease flow pattern within the bushing assembly 46 is established and maintained. The purging of contaminated grease from the bushing assembly through zerk window 62 provides visual verification that grease has filled the entire flow path and is pushing any contaminants through this path and eventually out of the bushing assembly 46.

Further attention is now directed to the first and second housing halves 50, 52. Each of the first and second housing halves 50, 52 is provided with a flanged portion 90, 92, respectively, surrounding the cavity 56. This flanged portion 90, 92 is primarily intended for affixing the first and second housing halves 50, 52 together and for providing means for fastening the housing halves to the first bracket 38. As shown in the drawings, one of the housing halves (in this case, 52) is be provided with a plurality of apertures 94 and the other housing half 50 provided with a complementary plurality of projections 95 sized and positioned so that insertion of the projections 95 into the apertures 94 results in alignment of the cavity portion of each housing half to form the complete cavity. Each housing half 50, 52 is also provided with a plurality of apertures 96 which are aligned when the housing halves are properly juxtaposed, the aligned apertures 96 providing a means for inserting fasteners 98 therethrough. These aligned apertures 96 and the fasteners 98 used with them permit the attachment of the juxtaposed housing halves as a combined unit into the aperture 37 in the inboard support bracket 38. In the preferred manner of use, this insertion of the combined housing halves as an assembled cartridge type bushing assembly 46 into the inboard support bracket aperture 37 is made from the inboard side of the inboard support bracket 38. In other words, and as shown in FIG. 1, the flange portions of both housing halves are inboard of the inboard support bracket 38. As is also shown in FIG. 1, the aperture 37 in the inboard support bracket 38 may be an open slot aperture rather than a closed aperture.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A shaft bushing assembly for supporting a portion of a brake shaft rotatably, substantially parallel to an axle having a bracket affixed thereto with an aperture in the bracket for receiving the bushing assembly, the shaft bushing assembly comprising:

a first housing half and a second housing half, said housing halves being juxtaposable to define a cavity, one of the housing halves provided with an aperture for entry of grease into and exit of grease out of the cavity;

a bushing, with an outside surface sized and adapted to be received in said cavity and an inside surface sized and adapted to receive the shaft, the bushing having first and second radial holes;

a grease zerk, seated in the housing aperture and communicating the outside of one of the housing halves directly through the first radial hole to a first grease reservoir defined by the inside surface of the bushing, an exterior surface of the shaft and a first and a second seal, said seals positioned along the shaft between the shaft and the bushing inside surface;

at least two seals for retaining grease in the cavity; and wherein the second radial hole provides a conduit for grease from the first grease reservoir to an annular space defined by the outside surface of the bushing, the housing halves and a third and a fourth seals, said third and fourth seals positioned along the shaft between the shaft and the housing halves, from which annular space grease may be purged through the aperture.

2. The brake shaft assembly of claim 1 wherein the first and second housing halves each has a flange portion surrounding the cavity.

3. The brake shaft assembly of claim 2 wherein the flange portion of each housing half has a plurality of corresponding apertures for fastening the housing halves to the first bracket.

4. The brake shaft assembly of claim 1 wherein each of the housing halves has a shaft receiving aperture coaxial with the cavity.

5. The brake shaft assembly of claim 4 wherein one of the pair of bushing end seals is seated along the shaft inside the cavity at each end of the bushing between the bushing and the aperture in the adjacent housing half.

6. The brake shaft assembly of claim 1 wherein the bushing has a generally spherical outside surface.

7. The brake shaft assembly of claim 5 wherein the pair of bushing end seals are double seal surface D-rings.

8. The brake shaft assembly of claim 5 wherein the inside surface of the bushing is provided at the first and second end thereof with a slot for receiving an O-ring.

9. The brake shaft assembly of claim 1, wherein the second radial hole is displaced 180 degrees from the first radial hole.

10. A brake shaft assembly for a vehicle having an axle with a wheel hub at an end of the axle and a brake actuating means located inboard from the wheel hub, the shaft assembly comprising:

a shaft having a first end and a second end, the first end of the shaft having a brake actuating lever arm attached thereto and the second end of the shaft having a cam fixed thereon;

a first and a second support bracket affixed to the axle, each of the brackets providing an aperture for passage of the shaft therethrough;

a first and a second bushing assembly supporting the shaft rotatably, substantially parallel to the axle, the first bushing assembly surrounding the shaft near the first end and retaining the shaft in the aperture of the first bracket and the second bushing assembly surrounding the shaft near the second end and retaining the shaft in the aperture of the second bracket;

wherein the first bushing assembly comprises:

a first housing half and a second housing half, said housing halves being juxtaposable to define a cavity;

a bushing, with an outside surface sized and adapted to be received in said cavity and an inside surface sized and adapted to receive the shaft;

a grease zerk communicating the outside of one of the housing halves through a zerk window with the cavity, a first radial hole in the bushing directly communicating the grease zerk with a first grease reservoir defined by the inside bushing surface and the exterior of the shaft, a second radial hole in the bushing communicating the first grease reservoir with a second grease reservoir defined by the outside of the bushing and the housing halves; and a pair of bushing end seals for retaining grease in the cavity in the first and second grease reservoirs such that grease flow out of the cavity occurs at the zerk window.

* * * * *